United States Patent [19]

Martin et al.

[11] Patent Number: 4,564,663

[45] Date of Patent: Jan. 14, 1986

[54] FREE RADICAL CURE OF THE BISMALEIMIDE OF DIMER DIAMINE

[75] Inventors: Eugene C. Martin; Albert A. De Fusco, both of Ridgecrest, Calif.

[73] Assignee: The United States of America as represented by the Secretary of the Navy, Washington, D.C.

[21] Appl. No.: 703,633

[22] Filed: Feb. 21, 1985

[51] Int. Cl.$^4$ ............................................. C08F 22/40
[52] U.S. Cl. ..................................................... 526/262
[58] Field of Search ......................................... 526/262

[56] References Cited

U.S. PATENT DOCUMENTS

| | | | |
|---|---|---|---|
| 3,160,612 | 12/1964 | Stewart et al. | 260/78 |
| 3,291,679 | 12/1966 | O'Brien | 162/164 |
| 3,928,286 | 12/1975 | Akiyama et al. | 260/47 UA |
| 4,269,961 | 5/1981 | Jones et al. | 526/262 |
| 4,323,662 | 4/1982 | Oba et al. | 525/281 |
| 4,351,932 | 9/1982 | Street et al. | 526/262 |

*Primary Examiner*—Paul R. Michl
*Assistant Examiner*—Alex H. Walker
*Attorney, Agent, or Firm*—Robert F. Beers; W. Thom Skeer; Shelley G. Precivale

[57] ABSTRACT

Free radical cure of the bismaleimide of dimer diamine is accomplished with hydroperoxides promoted with a vanadium trineodecanoate/N,N-dimethyl-p-toluidine mixture to form a hard polymer.

8 Claims, 2 Drawing Figures

FREE RADICAL CURE OF THE BISMALEIMIDE OF DIMER DIAMINE

BACKGROUND OF THE INVENTION

1. Field of the Invention

This invention relates to the field of polymer chemistry. More particularly, this invention relates to the free radical cure of a thermally stable polymer. Still more particularly, but without limitation thereto, this invention relates to the free radical cure of the bismaleimide of dimer diamine with hydroperoxides.

2. Description of the Prior Art

Polymers with improved heat resistance are in constant demand for use in composites, adhesives and coatings in missiles and aircraft. A critical requirement for polymers with these intended uses is typically prolonged exposure to temperatures up to 230° C. (450° F.) without significant degradation.

Aromatic substituted bismaleimide prepolymers have been considered because of their exceptional thermal stability after cure. Prepared from parent aromatic diamines and maleic anhydride, these prepolymers are usually solids at room temperature and commonly can be cured above their melting points at temperatures greater than 200° C. Because they are solids, these aromatic prepolymers require a solvent or must be heated to the melt temperature to be used.

For processing and fabrication purposes, it would be advantageous to cure bismaleimides without using a solvent and at lower temperatures. Application with solvents can be detrimental to the properties of the cured polymers since solvent molecules may remain trapped in the interstitial volume of the polymeric network. Attaining lower cure temperatures would result in less costly processes with decreased energy demands.

Aliphatic substituted bismaleimide "monomers" or prepolymers are a superior substitute for the aromatic systems since selected moderate molecular weight liquid diamines would yield liquid bismaleimides. Alternate cures, instead of thermal, of these materials could be accomplished at lower temperatures. Furthermore, the need for a solvent to facilitate processing these materials to thermally stable polymers can be eliminated so that structural integrity of the polymers can be maintained.

SUMMARY OF THE INVENTION

An object of the present invention is to provide a means for curing the bismaleimide of dimer diamine such that a thermally stable polymer can be prepared.

A further object of the present invention is to develop a moderate temperature free radical cure that does not require the use of a solvent.

These and other objects have been demonstrated by the present invention wherein the free radical cure of the bismaleimide of dimer diamine is accomplished with hydroperoxides promoted with a vanadium trineodecanoate/N,N-dimethyl-p-toluidine mixture to form a hard polymer.

DESCRIPTION OF THE PREFERRED EMBODIMENT

Figure 1:
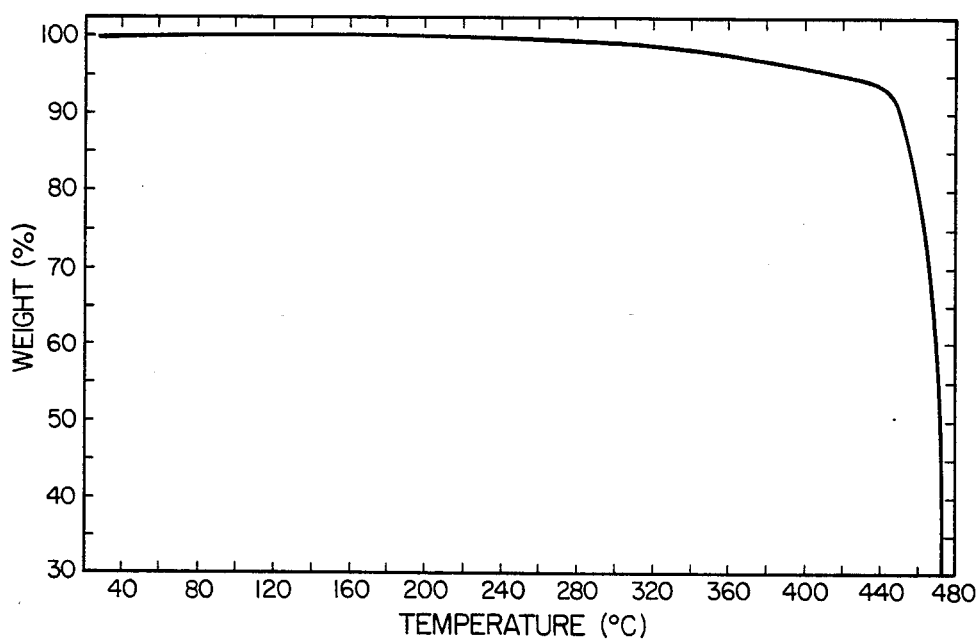
FIG. 1 illustrates the thermogravimetric analysis of a sample of the bismaleimide of dimer diamine polymer processed under air.

Olefin polymerization is well known and can be accomplished efficiently with free radical initiators such as peroxides. Knowledge of peroxide half-life temperatures aids in selecting the appropriate initiator such that optimum temperature ranges and cure times can be obtained in order to provide useful materials.

The bismaleimide of dimer diamine can be cured with a variety of peroxide initiators at various temperatures. Using t-butylperbenzoic acid, peroxide catalyst and di-t-butylperoxide promoted with N,N-dimethyl-p-toluidine requires 100° C. or more and 1.5 to 2.5 days to cure liquid resin samples of this bismaleimide. Benzoyl peroxide with a promoter at 100° C. after 4 days with bismaleimide gives a very soft polymer.

This invention provides a more efficient system such that the cure of bismaleimide can take place at 80°–100° C. in no more than 16 hours. This system uses peroxide and a vanadium trineodecanoate/N,N-dimethyl-p-toluidine promoter xylene solution. The preferred peroxides are t-butylhydroperoxide and cumene hydroperoxide. The promoter solution is described in detail by Henry et al., U.S. Pat. No. 4,374,777.

In general, curing under vacuum or in an inert atmosphere provides materials that are very hard and have tack-free surfaces. Since oxygen is known to inhibit free radical formation, curing in air results in polymers with uncured surfaces presumably from free radical quenching of the peroxide or propagating radical.

Table 1 shows the amounts of reagents (peroxide and vanadium trineodecanoate/N,N-dimethyl-p-toluidine) as well as the temperature used to cure the bismaleimide resin. The values given are only examples of suitable cures and therefore may vary somewhat.

TABLE 1

| Sample | Peroxide | Gm Peroxide/ Gm Resin | Gm Promoter/ Gm Resin | Temp, °C. | Time, Hrs. |
|---|---|---|---|---|---|
| A | cumene hydroperoxide | 0.011 | 0.0028 | 80 | 18 |
| B | t-butylhydroperoxide | 0.011 | 0.0028 | 100 | 16 |
| C | cumene hydroperoxide | 0.011 | 0.0014 | 100 | 16 |
| D | t-butylhydroperoxide | 0.022 | 0.0050 | 100 | 18 |

In all cases, the time to gel formation is greater than 1.5 hours. If more than 0.0028 grams of promoter solution per gram of resin is used with cumene hydroperoxide, gel formation occurs too rapidly to allow satisfactory mixing, casting and degassing time. This problem is not evident with t-butylhydroperoxide where 0.0050 grams of promoter solution per gram of resin can be used.

In order to characterize the polymerization process, infrared (IR) spectroscopy is useful for evaluating these polymers since differences between a maleimide resin and its cured material can be easily identified.

An IR spectrum from 2000 to 400 $cm^{-1}$ of the "monomer" bismaleimide compared to that of the bismaleimide polymer from free radical cure provides the following information. The absorption for the maleimide carbonyls is at 1709 cm$^{-1}$. This changes drastically after polymerization where two peaks at 1774 and 1703 cm$^{-1}$ are evident and due to unsymmetrical stretching vibrations between the two carbonyls of the polymerized maleimide group. A peak at 1354 cm$^{-1}$ is also present in the polymer but absent in the "monomer" which indicates a methyne C-H deformation arising from polymerization of the maleimide double bond. Significant changes in the 800-400 cm$^{-1}$ region are noteworthy. Nearly all of the absorption intensity for the maleimide olefin at 696 cm$^{-1}$ is absent in the polymer. Furthermore, the doublet that appears at 741 and 722 cm$^{-1}$ in the polymer is due to crystal field splitting of polymethylene rocking motions in the dimer diamine backbone.

Differential scanning calorimetry (DSC) of a typical sample of bismaleimide displays exotherms at about 140° and 350° C. in air. Cooling the sample back to ambient temperature followed by heating past 350° C. shows disappearance of the exotherms. Small amounts of unreacted olefins presumably remain in the otherwise cured material such that annealing past 350° C. for even very short times causes their thermal polymerization. However, in N$_2$ atmosphere the sample does not show an exotherm at 350° C. This result indicates that the latter exotherm at 350° C. is due to oxidative decomposition of the polymer. Samples of polymers post-cured at 180° C. for 2 to 3 hours also show exotherms at 140 and 350° C. in their DSC curves, indicating that a higher temperature or prolonged exposure may be required for complete post-cure.

Comparison of IR spectra of bismaleimide and its polymeric product provides information on the approximate extent of cure and complement DSC thermograms. The bismaleimide "monomer" exhibits a peak at 696 cm$^{-1}$, which is used to evaluate the extent of cure by determining the residual amount of unreacted maleimide groups through peak integration after cure. Unreacted maleimide remaining in the polymer amounts to approximately 15%.

This result is typical of all the samples (Table 2) evaluated by IR spectroscopy even after post-cure and reflects a situation where post-curing at 180° C. does not aid in polymerizing residual maleimide olefins. Support for this latter result is given by DSC where the exotherms at 140° C. can be integrated and related to sample size. However, the samples which are post-cured (Table 2) do not show smaller peak areas than samples that are not post-cured thereby indicating that a temperature greater than 180° C. may be required for complete post-cure of the bulk samples (about one gram of mass).

TABLE 2

| Sample | Energy$^a$ (J/gm) |
| --- | --- |
| B | 12.4 (19.9)$^b$ |
| C | 38.3 (50.6) |
| D | 20.2 (11.5) |

$^a$relative energies of DSC exotherms at 140° C.
$^b$the numbers in parentheses are those for post-cured samples Thermogravimetric analysis of a typical sample, FIG. 1, indicates that the cured material is very stable to heating in air since only 1% of the polymer mass is lost through decomposition at 270° C. Rapid decomposition then follows at about 445° C. Post-cured samples also display this same type of decomposition in air, indicating that they do retain thermal stability even when heated at 180° C. for 2-3 hours.

Figure 2:
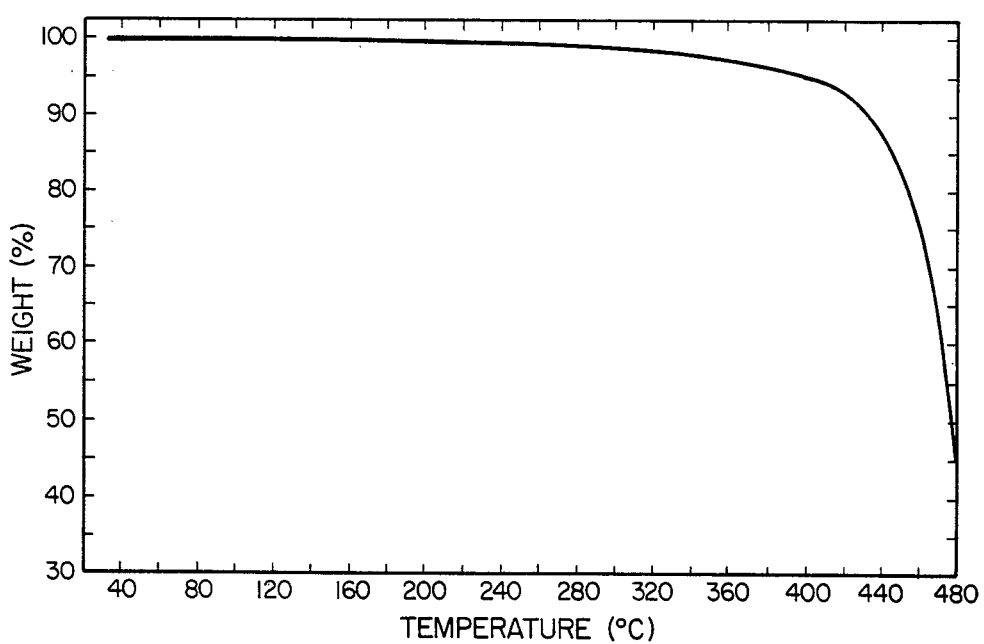
FIG. 2 illustrates the thermogravimetric analysis of a sample of the bismaleimide of dimer diamine polymer processed under $N_2$.

Under a N$_2$ atmosphere, FIG. 2, the samples lose 1% of their weight at 320° C. and also decompose at a higher temperature than in air. Because of this latter effect, the bismaleimide is amenable to processing in an inert atmosphere or under vacuum at temperatures less than 320° C. if necessary, without significant decomposition of the resulting polymer.

Tensile tests were performed on the cured samples and the results are presented in Table 3.

TABLE 3

| Sample | Strength at Break$^a$ ($\sigma$, psi) | Initial Modulus$^a$ (E$_o$, psi) | % Elongation$^a$ (Stress) |
| --- | --- | --- | --- |
| B$^b$ | 1,488 (1,435) | 14,387 (18,214) | 15.2 (9.5) |
| C$^b$ | 955 (1,210) | 6,293 (16,436) | 18.0 (10.0) |
| D$^c$ | 1,046 (1,548) | 22,443 (21,045) | 7.6 (10.9) |

$^a$the numbers in parentheses represent the samples after post-curing
$^b$post-cured at 180° C. for two hours
$^c$post-cured at 180° C. for three hours It can be seen that the polymers produced from using larger amounts of peroxide and promoter (for example, sample D versus sample B, Table 1) possess greater tensile strength at break ($\sigma$) and tensile modulus (E$_o$) presumably due to more efficient polymerization during cure.

EXAMPLE

Approximately three grams of bismaleimide is weighed into a polypropylene cup. The promoter solution, consisting of vanadium trineodecanoate and N,N-dimethyl-p-toluidine in a xylene solution (prepared according to Henry et al., U.S. Pat. No. 4,374,777) is then added and the mixture is folded manually with a spatula for a few minutes. The peroxide, cumene hydroperoxide or t-butylhydroperoxide, is then added and the mixture again folded well for a few minutes followed by quickly casting into molds. The molds are made of Sylgard 184 (Dow Corning) with the shape of minidogbones (1" long by ⅛" thick) and are pretreated with a Teflon mold-release spray.

The molds are then placed in a vacuum oven at room temperature and evacuated to degas the samples. After several minutes under vacuum (27 in Hg), N$_2$ gas is bled into the vacuum oven until a positive pressure is obtained. This degas/purge process is repeated twice.

Once the degas/purge cycles are complete, the specimens are heated to the desired temperature for a length of time (see Table 1 for specific examples) under a blanket of N$_2$. At the end of the heating period, the specimens are allowed to cool slowly under N$_2$ and then removed for testing.

Post-curing is accomplished by placing the specimens on a glass plate previously treated with a Teflon mold-release spray and then placed in a preheated oven (180° C.) in air.

This invention provides a means for polymerizing the bismaleimide of dimer diamine into a very hard material. The polymers from this aliphatic bismaleimide are also very thermally stable.

This invention has been described in detail with particular reference to certain preferred embodiments thereof, but it will be understood that variations and modifications can be effected within the spirit and scope of the invention.

What is claimed is:

1. The free radical cure of the bismaleimide of dimer diamine comprising the steps of:
   mixing a promoter solution with said bismaleimide to form a first mixture;
   adding a hydroperoxide to said first mixture to form a second mixture;
   degassing said second mixture;
   purging said second mixture; and
   heating said second mixture.

2. The cure of claim 1 wherein said promoter solution comprises vanadium trineodecanoate, N,N-dimethyl-p-toluidine and xylene.

3. The cure of claim 1 wherein said hydroperoxide is cumene hydroperoxide.

4. The cure of claim 3 wherein said second mixture has the following composition by weight: 0.0014–0.0028 parts promoter solution per part bismaleimide and 0.011 parts cumene hydroperoxide per part bismaleimide.

5. The cure of claim 1 wherein said hydroperoxide is t-butylhydroperoxide.

6. The cure of claim 5 wherein said second mixture has the following composition by weight: 0.0028–0.0050 parts promoter solution per part bismaleimide and 0.011–0.022 parts t-butylhydroperoxide per part bismaleimide.

7. The cure of claim 1 wherein said purging step is carried on with an inert gas.

8. The cure of claim 1 wherein said heating step is carried on at 80°–100° C.

* * * * *